United States Patent [19]
Radhakrishnan et al.

[11] Patent Number: 6,049,526
[45] Date of Patent: Apr. 11, 2000

[54] ENHANCED INTEGRATED RATE BASED AVAILABLE BIT RATE SCHEDULER

[75] Inventors: Sivakumar Radhakrishnan, Vancouver; Stephen J. Dabecki, Maple Ridge, both of Canada; David Wong, Spokane, Wash.

[73] Assignee: PMC-Sierra Ltd., Burnaby, Canada

[21] Appl. No.: 08/916,342

[22] Filed: Aug. 22, 1997

Related U.S. Application Data

[63] Continuation-in-part of application No. 08/622,398, Mar. 27, 1996, Pat. No. 5,706,288.

[51] Int. Cl.[7] ........................................... H04J 3/22
[52] U.S. Cl. ......................... 370/229; 370/412; 370/399
[58] Field of Search .................................. 370/229, 230, 370/231, 232, 233, 234, 235, 412, 395, 396, 397, 398, 399, 417, 418, 468

[56] References Cited

U.S. PATENT DOCUMENTS

| | | | |
|---|---|---|---|
| 5,706,228 | 1/1998 | Radhakrishnan et al. | 370/412 |
| 5,751,697 | 5/1998 | Radhakrishnan et al. | 370/229 |
| 5,754,530 | 5/1998 | Awdeh et al. | 370/232 |
| 5,862,206 | 1/1999 | Thomas et al. | 370/229 |
| 5,889,779 | 3/1999 | Lincoln | 370/412 |
| 5,940,368 | 4/1999 | Takamichi et al. | 370/229 |

*Primary Examiner*—Huy D. Vu
*Attorney, Agent, or Firm*—Oyen Wiggs Green & Mutala

[57] ABSTRACT

An available bit rate scheduler for asynchronous transfer mode communication of a plurality of cells over a communication network in which each cell is characterized by a virtual circuit communication channel and in which each virtual circuit is characterized by one or more profiles. Each profile has a group of sub-profiles, with each sub-profile having a unique bandwidth allocation component. The scheduler incorporates a profile queue buffer for receiving, pairing and storing the profiles and sub-profiles and, a link list processor coupled to the profile queue buffer to receive the profile, sub-profile pairs. The link list processor detects null profile, sub-profile pairs in the buffer and, over-write them with a selected one of the virtual circuit profile, sub-profile pairs. A valid pending register of length p bits, and a memory are coupled to the link list processor. The memory stores pointers to link lists of virtual circuits associated with each of the profile, sub-profile pairs received by the link list processor. The pointers comprise, for each of the link lists, a head pointer to a first entry in the link list and a next pointer to a virtual circuit in the link list last associated by the link list processor with one of the profile, sub-profile pairs.

16 Claims, 23 Drawing Sheets

(1) Remove 2 pairs of valid profile_buffer entries
(2)     If both entries are NULL then    /* All zeros denotes an empty slot condition, now scan pending VCs */
(3)             If (vp_register)   /* atleast one of the locations of vp_register has a '1' */
(4)                 Scan vp_register sequentially and search for the first valid location $i$.
(5)                     where $i$ denotes the profile number
(6)                 For each subprofile $j$ within profile $i$ do
(7)                     Extract Valid Pending pointer bit VP(i,j)
(8)                     If (VP(i,j) == 1) then /* Search subprofile and dispatch VC */
(9)                         Obtain the VC pointed to by NP(i,j) in the link-list
(10)                        Interrogate with ARMS module and
(11)                            send VC token Number to queue
(12)                        Indicate type of cell
(13)                            - FRM, BRM (In/Out of rate) or data
(14)                        cell_count = cell_count + 1;
(15)                        Update the next pointer address NP(i,j) in memory
(16)                        If NP(i,j) is NULL then   /* end of list is reached */
(17)                            VP(i,j)=0;          /* Reset pointers */
(18)                            NP(i,j)=0;
(19)                        end
(20)                    end
(21)                end
(22)                If at least one of VP(i,j) is set then /* perform OR-operation */
(23)                    vp_register(i) = 1 */
(24)                else                    /* all pending VCs in profile i */
(25)                    vp_register(i) = 0  /* have been sent         */
(26)                end
(27)                cell_count = cell_count - 1;  /* Decrement to remove current slot */
(28)        else /* Current slot is empty */
(29)            Send Null pointer to output    /* Do not write anything to FIFO */
(30)        end
(31) else /* profile_queue has some data to be sent*/
(32)        For each of the 2 profile_queue entries that has valid data do
(33)            i=p_num /* Assign the read profile number to variable i */
(34)            Fetch vp_register(i)
(35)            while (vp_register(i)) do,          /* over provisioned case , repeat until */
(36)                For each subprofile $j$ within profile i do /* all pending VCs are sent*/
(37)                    Extract Valid Pending pointer bit VP(i,j)
(38)                    If (VP(i,j) == 1) then    /* Search subprofile, dispatch VC */
(39)                        Obtain the VC pointed to by NP(i,j) in the link-list and
(40)                        Interrogate with ARMS module and
(41)                            send VC token Number to queue.
(42)                        Indicate the type of cell
(43)                            - FRM, BRM (In/Out of rate) or data
(44)                        cell_count = cell_count + 1;
(45)                        Update the next pointer address NP(i,j) in memory
(46)                        If NP(i,j) is NULL then   /* end of list is reached */
(47)                            VP(i,j)=0;          /* Reset pointers */
(48)                            NP(i,j)=0;
(49)                        end

FIG. 3A

```
(50)                        end
(56)               end    /* VCs are dispactched vertically then horizontally */
(51)               If atleast one of VP(i,j) is set then    /* perform OR-operation */
(52)                        vp_register(i) = 1
(53)               else    /* all pending VCs in profile i have been sent */
(54)                        vp_register(i) = 0
(55)               end
(57)      end    /* cycle through sending all VCs in profile i till vp_register(i)=0 */
(58)      For each entry j in subprofile_vector(i) do    /* Service all subprofiles in p_num*/
(59)      /* This condition denotes Startup or UP or after servicing an OP case as above
*/
(60)               Fetch the Head pointer HP(i,j) address    /* Obtain address to scan */
(61)               NP(i,j) = HP(i,j)          /* first entry and assign to Next pointer */
(62)               Obtain the VC pointed to by NP(i,j) in the link-list
(63)               Interrogate with ARMS module and send VC token Number to queue
(68)                        Indicate type of cell
(69)                                 - FRM, BRM (In/Out of rate) or data cells
(70)               cell_count = cell_count + 1;
(71)               Update the next pointer address NP(i,j)  in memory
(72)               If NP(i,j) is NULL then    /* end of list has been reached */
(73)                        VP(i,j)=0         /* Reset pointers */
(74)                        NP(i,j)=0
(75)               else
(76)                        VP(i,j) = 1 /* Since left over VCs have to be dispatched later
*/
(77)                        vp_register(i)=1 /* Assert vp_register(i) to denote that profile
i
(78)                                          is pending */
(79)               end
(80)      end
(81)      cell_count = cell_count -1;
(82)  end  /* If */
(83). end Repeat /* terminate after scanning all entries until fresh data is available*/
```

FIG. 3B

```
Procedure ABRP_MCR_Arbitrator(enable, abrp_queue, mcr_queue, abr_merged_queue)
Input : abrp_queue, mcr_queue, enable
Output: merged_queue
(1)  While (enable) do         /* Arbitrator scans and outputs data from MCR or ABRP_queue when enabled */
(2)    MCR_queue_data_invalid = True  /* At start, assume MCR queue has no data */
(3)    If head of MCR_queue has valid data then  /* Check for validity of data in MCR_queue
                                                    since it has higher priority */
(4)       Send data from MCR_queue to ABR_Merged_queue;  /* Transfer MCR_queue info to O/P */
(5)       MCR_queue_data_invalid = False  /* Reset flag since MCR queue had data
                                             which has been transmitted to O/P*/
(6)    end
(7)    If ABRP_buffer is empty then   /* Check if intenal ABRP buffer has free space */
(8)       If (MCR_queue_data_invalid) then         /* No MCR data available */
(9)          Transmit NULL to ABR_merged_queue    /* No data is sent since MCR queue
                                                     is empty as well */
(10)      else
(11)         Update ABRP_queue pointer; /* To read the next ABRP entry */
                                        /* MCR_queue had data which was transmitted  TO O/P
(12)         If head of ABR_queue has valid data then  /* Check for validity of data in ABR queue */
(13)            Copy data from head of ABRP_queue to ABRP_buffer ; /* Append to
                internal ABRP_buffer*/
(14)            Update ABRP_buffer pointer; /* To read the next ABR queue entry */
(15)         end
(16)         Update ABRP_queue pointer; /* To read the next ABR queue entry */
(17)      end
(18)   else   /* ABRP_buffer has data and the buffer is either full or partially filled up*/
(19)      If (MCR_queue_data_invalid) then         /* No MCR data available */
(20)         Read from head of ABRP_buffer and transmit data to merged_queue
(21)         Update ABRP_buffer pointer;   /* To read the next entry */
(22)         If head of ABRP_queue has valid data then /* Check for data validity in ABRP queue */
(23)            Copy data from head of ABRP_queue to ABRP_buffer;
                                                     /*Append to ABRP_buffer*/
(24)            Update ABRP_buffer pointer;   /* To read the next entry */
(25)         end
(26)         Update ABRP_queue pointer; /* To read the next ABR queue entry */
```

FIG. 6A

```
(27)        else         /* MCR_queue had data which was transmitted; hence ABR is denied slot*/
(28)            If ABRP_buffer is NOT FULL then ; /* Check if ABRP_buffer has empty space */
(29)                If head of ABRP_queue has valid data then
(30)                    Copy data from head of ABRP_queue to ABRP_buffer ;
                                                            /*Append to ABRP_buffer*/
(31)                    Update ABRP_buffer pointer; /* To read the next entry */
(32)                end
(33)                Update ABRP_queue pointer; /* To read the next ABR queue entry */
(34)        end
(35)    end
(36) end
(37) Update MCR_queue pointer;  /* To read the next MCR_queue entry */
(38) end    /* Mark end of enable loop for arbitrator */
```

FIG. 6B

```
Procedure priority_servicer()
(1)  foreach timeslot do
(2)    If (ABR_priority_threshold = count) then              /* ABR transmit opportunity.
(3)      If (ABR token) then                                 /* if ABR token, then send it and reset counter.
(4)        send ABR token
(5)        count = 0
(6)      Elsif (UBR token) then                              /* Otherwise, give the timeslot over to UBR, but
(7)        send UBR token                                    /* hold the counter ready for next timeslot.
(8)        count = count
(9)      Else                                                /* Timeslot empty,
(10)       count = count                                     /* no ABR or UBR, hold count
(11)     Endif
(12)   Elsif (UBR token) then                                /* UBR transmit opportunity.
(13)     send UBR token                                      /* if UBR token, then send it and increment counter.
(14)     count = count + 1
(15)   Elsif (ABR token) then                                /* Otherwise, give the timeslot over to ABR, but
(16)     send ABR token                                      /* hold the counter ready for next timeslot.
(17)     count = count
(18)   Else                                                  /* Timeslot empty,
(19)     count = count                                       /* no ABR or UBR, hold count
(20)   Endif
(21) Endfor
```

FIG. 8

| CASE | LOAD | | ABR_PSEL | % of B/W | |
|---|---|---|---|---|---|
| | ABR | UBR | | ABR | UBR |
| 1 | 100% | 100% | 50% | 50% | 50% |
| 2 | 100% | 100% | 0% | 0% | 100% |
| 3 | 100% | 100% | 100% | 100% | 0% |
| 4 | 100% | 100% | 75% | 75% | 25% |
| 5 | 100% | 100% | 12.5% | 12.5% | 87.5% |
| 6 | 50% | 100% | 100% | 50% | 50% |
| 7 | 100% | 10% | 0% | 90% | 10% |
| 8 | 100% | 0% | 0% | 100% | 0% |
| 9 | 100% | 0% | 62.5% | 100% | 0% |
| 10 | 0% | 100% | 25% | 0% | 100% |

FIG. 9

| Profile p | Link List Subprofile | VC No. | Desired Rate (DR) | Measured Rate (MR) Max=16 | $\lambda = \dfrac{MR}{DR}$ | Bandwidth Utilization Total=16 |
|---|---|---|---|---|---|---|
| 2 | 1 | 1 | 8 | 8 | 100% | 50.00% |
| 4 | 1 | 2 | 2 | 2 | 100% | 12.50% |
|   |   | 3 | 2 | 2 | 100% | 12.50% |
| 5 | 1 | 4 | 1 | 1 | 100% | 6.25% |
|   |   | 5 | 1 | 1 | 100% | 6.25% |
|   |   | 6 | 1 | 1 | 100% | 6.25% |
|   |   | 7 | 1 | 1 | 100% | 6.25% |

FIG. 11

| Profile $p$ | Link List Subprofile | VC No. | Desired Rate (DR) | Measured Rate (MR) Max=16 | $\lambda = \dfrac{MR}{DR}$ | Bandwidth Utilization Total=13.15 |
|---|---|---|---|---|---|---|
| 3 | 3 | 1 | 3 | 2.974 | 99.151% | 22.616% |
|   |   | 2 | 3 | 2.974 | 99.151% | 22.616% |
|   |   | 3 | 3 | 2.976 | 99.200% | 22.627% |
|   |   | 4 | 3 | 2.979 | 99.328% | 22.656% |
| 4 | 4 | 5 | 1.25 | 1.247 | 99.764% | 9.481% |

FIG. 14

| Profile p | Link List Subprofile | Link List VC No. | Desired Rate (DR) | Measured Rate (MR) Max=16 | $\lambda = \dfrac{MR}{DR}$ | Bandwidth Utilization Total=16 |
|---|---|---|---|---|---|---|
| 1 | 1 | 1 | 16 | 4.017 | 25.110% | 25.108% |
|   |   | 2 | 16 | 4.017 | 25.107% | 25.098% |
| 2 | 2 | 3 | 7 | 1.737 | 24.813% | 10.852% |
|   |   | 4 | 7 | 1.736 | 24.810% | 10.850% |
|   |   | 5 | 7 | 1.736 | 24.810% | 10.850% |
| 3 | 1 | 6 | 4 | 1.004 | 25.098% | 6.272% |
|   |   | 7 | 4 | 1.003 | 25.089% | 6.270% |
| 5 | 1 | 8 | 1 | 0.251 | 25.092% | 1.567% |
|   |   | 9 | 1 | 0.251 | 25.093% | 1.567% |
|   |   | 10 | 1 | 0.251 | 25.093% | 1.567% |

FIG. 16

| VC # | $ACR_i$ (DR) | $MCR_i$ | $ACR'_i$ (DR) | $ACRQ'_i$ (MR) | $\lambda = \dfrac{MR}{DR}$ | Bandwidth ratio |
|---|---|---|---|---|---|---|
| 1 | 8 | 0 | 8 | 6.406 | 80.07% | 40.04% |
| 2 | 8 | 0 | 8 | 6.408 | 80.10% | 40.06% |
| 3 | 4 | 1 | 3 | 2.382 | 79.40% | 14.89% |
| 4 | 3 | 2 | 1 | 0.801 | 80.10% | 5.01% |
| 5 | 1 | 1 | 0 | 0 | 0.00% | 0.00% |
| Total | 24 | 4 | 20 | 15.997 | | 100% |

FIG. 18

| VC # | ACR$_i$ | MCR$_i$ (MCR queue) | ACR'$_i$ | ACRQ'$_i$ (ABRP queue) | CCR$_i$ (DR) (Theoretical) | CCR$_i$ (MR) (Actual) | $\lambda = \frac{MR}{DR}$ |
|---|---|---|---|---|---|---|---|
| 1 | 8 | 0 | 8 | 6.406 | 4.805 | 4.802 | 99.937% |
| 2 | 8 | 0 | 8 | 6.408 | 4.806 | 4.804 | 99.958% |
| 3 | 4 | 1 | 3 | 2.382 | 2.787 | 2.792 | 100.179% |
| 4 | 3 | 2 | 1 | 0.801 | 2.601 | 2.604 | 100.115% |
| 5 | 1 | 1 | 0 | 0 | 1.000 | 1.000 | 100.000% |
| Total | 24 | 4 | 20 | 15.997 | 15.999 | 16.002 | |

FIG. 19

| VC # | $ACR_i$ | $MCR_i$ (MCR queue) | $ACR'_i$ | $ACRQ'_i$ (ABRP queue) | $CCR_i$ (DR) (Theoretical) | $CCR_i$ (MR) (Actual) | $\lambda = \frac{MR}{DR}$ |
|---|---|---|---|---|---|---|---|
| 1 | 8 | 0 | 8 | 6.406 | 4.805 | 4.802 | 99.937% |
| 2 | 8 | 0 | 8 | 6.408 | 4.806 | 4.804 | 99.958% |
| 3 | 4 | 1 | 3 | 2.382 | 2.787 | 2.792 | 100.179% |
| 4 | 3 | 2 | 1 | 0.801 | 2.601 | 2.604 | 100.115% |
| 5 | 1 | 1 | 0 | 0 | 1.000 | 1.000 | 100.000% |
| Total | 24 | 4 | 20 | 15.997 | 15.999 | 16.002 | |

FIG. 20

ENHANCED INTEGRATED RATE BASED AVAILABLE BIT RATE SCHEDULER

REFERENCE TO RELATED APPLICATION

This is a continuation-in-part of U.S. application Ser. No. 08/622,398 filed Mar. 27, 1996, now U.S. Pat. No. 5,706,288.

TECHNICAL FIELD

This application pertains to an available bit rate (ABR) scheduler for use in asynchronous transfer mode (ATM) communications involving ABR connections which require non-zero minimum cell rate (MCR) support.

BACKGROUND

ATM is a networking protocol which supports a variety of applications having distinct bandwidth requirements and distinct tolerances for delay, jitter, cell loss, etc. ATM networks provide different "service classes" at different prices which reflect the differing quality of service (QoS) provided by each class. The QoS can define minimum levels of available bandwidth, and place bounds on parameters such as cell loss and delay. The user informs the network, upon connection set-up, of the expected nature of the traffic to be sent by the user along the connection, and of the QoS required for such connection.

The ABR service class supports variable rate data transmissions without preserving timing relationships between source and destination. ABR users are provided guaranteed service with respect to cell loss, and "fair" access to available bandwidth as determined by predefined fairness criteria. The user receives only the network's best attempt to maximize the user's available bandwidth or allowed cell rate (ACR), through the use of feedback flow control mechanisms. Such mechanisms facilitate control over the amount of traffic allowed into the network, and hence minimization of cell loss due to congestion. A traffic shaping algorithm, controlling the ACR, is used at the source to control the traffic rate into the network, based upon a congestion indicator in the received cells.

Pre-defined traffic parameters characterize the traffic sent over an ATM connection. Parameters such as minimum cell rate (MCR), peak cell rate (PCR), cell delay variation tolerance (CDVT), sustainable cell rate (SCR) and burst tolerance (BT) characterize the traffic stream in general, although not all parameters are meaningful for all service classes. For example, in ABR service, the PCR determines the maximum value of the ACR, which is dynamically controlled by the ATM network, using congestion control mechanisms, to vary between the MCR and PCR.

When setting up a connection, the requesting node informs the network of the required service class, the traffic parameters of the data to be passed in each direction along the connection, and the QoS requested for each direction. Establishment of an ATM connection having specified traffic descriptors constitutes a traffic "contract" between the user and the network. The network offers a QoS guarantee appropriate to the service class requested by the user. In return, the user must confine traffic sent over the connection in compliance with the attributes of the traffic contract for the requested service class. ATM network switches police the user's traffic via algorithms which determine whether the cell stream is compliant with the traffic contract.

An ABR scheduler is an essential and integral part of any ATM implementation offering ABR service. Its purpose is to determine when cells are ready to be transmitted in a fair and efficient manner. In this context, "fairness" means that all service classes should be given an equal opportunity; "efficiency" means that cells should be transmitted at or near their specified rates. U.S. application Ser. No. 08/622,398 (hereafter "the '398 application") which is hereby incorporated by reference, describes the implementation of an ABR scheduler having the necessary attributes of fairness and efficiency.

In an ATM network, a communication channel may be characterized by a virtual circuit (VC) defined by pre-selected traffic and QoS parameters. The problem, in providing ABR service, is to efficiently manage transmission of cells pertaining to different VCs. The allowed cell rate (ACR) at which a cell belonging to a given VC is transmitted varies between the minimum cell rate (MCR) and the peak cell rate (PCR), which are negotiated when the VC is established. The ACR is a floating point number as defined in the ATM Forum specifications, and expressed as $$ACR = \left(1 + \frac{m}{512}\right)2^e \quad (1)$$

where $0 \leq e \leq 31$ and $0 \leq m \leq 511$. ACR covers a wide dynamic range between 1 cell/sec to 32 Gigacells/sec.

In order to permit efficient scheduling of VCs in an ABR service, the ABR scheduler described in the '398 application uses a classification scheme in which VCs are indexed according to their exponents and mantissa to form groups of "profiles" and "sub-profiles". More particularly, a profile i, $1 \leq i \leq p$ is a collection of VCs whose ACRs fall within a closed range:

$$\left[1 \cdot \overline{X} \times 2^{p-i}, ..., \left(1 + \frac{1}{sp}\right) \times 2^{p-i-1}\right] \quad (2)$$

where p is the number of profiles, sp is the number of sub-profiles, and $0 \leq \overline{x} < 1/sp$ such that the effective profile rate is then given by $2^{p-i}$. A sub-profile j, $1 \leq j \leq sp$ is a subset of VCs belonging to profile i, $1 \leq i \leq p$ such that their ACRs default to the nearest and smaller rate given by:

$$\left(1 + \frac{(sp - j + 1)}{sp}\right) \times 2^{p-i-1} \quad (3)$$

For example, if p=sp=4 then the sub-profile rates conforming to the above definition are summarized in Table 1.

TABLE 1

| Profile | Sub-profile rates (cells/second) | | | |
|---|---|---|---|---|
| | 1 | 2 | 3 | 4 |
| 1 | 8 | 7 | 6 | 5 |
| 2 | 4 | 3.5 | 3 | 2.5 |
| 3 | 2 | 1.75 | 1.50 | 1.25 |
| 4 | 1 | 0.875 | 0.750 | 0.625 |

Note that the rates of sub-profile 1 in each of the four profiles are identical to the profile rates of 8, 4, 2 and 1 respectively. It can be seen that the larger the number of sub-profiles, the finer the granularity and therefore the VCs will be scheduled closer to their ACRs, consequently increasing hardware and computational requirements.

Whenever a VC is provisioned (i.e. allocated), the ACR of the corresponding VC is uniquely mapped to one of the closest and smallest profile/sub-profile rates. The smaller rate is chosen, since otherwise the negotiated traffic contract may be violated by scheduling a cell at a rate faster than the ACR.

By quantizing VCs based on the exponent values of their rates, a fast deterministic search can be performed to service the profiles. A linear search on the sub-profiles is then conducted and, using a virtual time algorithm wherein the next cell time is calculated based on its ACR, the system clock frequency and the number of profiles, it can be uniquely determined whether the chosen VCs are ready for transmission by comparing with the current cell time.

The ABR scheduler of the '398 application also maintains a table (in memory) in which VCs are stored along with negotiated traffic contract parameters such as PCR, MCR, etc. A linked list of VCs is attached to each profile/sub-profile. When a particular profile/sub-profile is ready to be transmitted (as determined by the scheduler algorithm summarized above), the entire list linked to that profile/sub-profile is serviced and the ATM cells are placed in the ABR output queue for transmission.

The scheduler also interacts with an ABR contract module which implements source/destination behaviour functions in accordance with ATM Forum-defined congestion management protocols and links/delinks the VCs to the various profiles/sub-profiles in the table dynamically, depending on its state. For example, if congestion is detected in the network, then the ACR for a particular VC is reduced by a predetermined amount and accordingly the VC's link to a profile/sub-profile needs to be updated.

The ABR scheduler described in the '398 application assumes a negotiated zero MCR for all VCs, and assumes an available bandwidth equal to the full line rate. By quantizing the ACR into a finite subset of traffic profiles to which the provisioned VCs are attached, the ABR scheduler of the '398 application searches and outputs a sequence of traffic profile addresses. For each element in this sequence, all VCs that are attached to the selected traffic profile are scanned linearly and dispatched to the output.

The ABR scheduler of the '398 application performs well statistically, according to the rate weighted bandwidth distribution scheme for different degrees of provisioning (i.e., under, equal or over provisioned cases). However, it suffers from the problem of "cell clumping" for the equal and under provisioned cases, due to the aforementioned linear scanning of each link list. For these two cases, cell clumping occurs when VCs whose ACRs are lower than the peak bandwidth are scheduled at the line rate. The size of each such burst is dependent on the number of VCs attached to the given traffic profile in the link list. The longer the link list, the greater the burst length (cell clumping). Consequently, buffer overflows may occur in downstream ATM switches and/or at the destination. Avoidance and/or reduction of such overflows is of paramount importance.

The ABR scheduler of the '398 application does not suffice for ABR connections requiring non-zero MCR support and accordingly cannot provide a minimum guaranteed bandwidth; nor does the '398 application's scheduler accomodate VC buffer overflow. The present invention addresses these shortcomings in a manner which satisfies the efficiency and fairness criteria for bandwidth allocation. The present invention also provides a flexible arbitration scheme for mixing ATM cells of various traffic sources such as ABR, unspecified bit rate (UBR), variable bit rate (VBR) and constant bit rate (CBR), such that the relative proportion of each stream can be varied as desired.

SUMMARY OF INVENTION

The invention provides an available bit rate scheduler for asynchronous transfer mode communication of a plurality of cells over a communication network in which each cell is characterized by a virtual circuit communication channel. An MCR scheduler receives MCR-rate virtual circuits requiring minimum cell rate transmission service through the network and outputs the MCR-rate virtual circuits at a constant bit rate. An ABR' scheduler receives ABR-rate virtual circuits requiring available bit rate transmission service through the network and outputs the ABR-rate virtual circuits at an effective allowed cell rate $ACR'_i = ACR_i - MCR_i$ where $0 \leq i \leq (n-1)$ and n is the total number of virtual circuits.

A first arbitrator coupled to the MCR scheduler and to the ABR' scheduler receives the MCR-rate and ABR-rate virtual circuits and outputs them in a merged priority sequence in which any of the MCR-rate virtual circuits received from the MCR scheduler are output before any of the ABR-rate virtual circuits received from the ABR' scheduler are output. The ABR-rate virtual circuits are stored in a buffer by the first arbitrator while the MCR-rate virtual circuits are output. The buffer is of a size sufficient to store at least two ABR-rate virtual circuits.

A second arbitrator coupled to the first arbitrator receives the MCR-rate and ABR-rate virtual circuits output by the first arbitrator. The second arbitrator is also coupled to a UBR source of UBR-rate virtual circuits requiring unspecified bit rate transmission service through the network. The second arbitrator further has a first buffer for receiving and storing MCR-rate and ABR-rate virtual circuits received from the first arbitrator; a second buffer for receiving and storing UBR-rate virtual circuits received from the UBR source; first programmable means for outputting MCR-rate and ABR-rate virtual circuits from the first buffer at a user-programmable priority rate between 0% and 100%; and, second programmable means for outputting UBR-rate virtual circuits from the second buffer at a priority rate of 100% less said user-programmable priority rate.

The invention further provides an available bit rate scheduler for asynchronous transfer mode communication of a plurality of cells over a communication network in which each cell is characterized by a virtual circuit communication channel and in which each virtual circuit is characterized by one or more profiles. Each profile has a group of sub-profiles, with each sub-profile having a unique bandwidth allocation component. The scheduler incorporates a profile queue buffer for receiving, pairing and storing the profiles and sub-profiles and, a link list processor coupled to the profile queue buffer to receive the profile, sub-profile pairs. The link list processor detects null profile, sub-profile pairs in the buffer, and over-writes them with a selected one of the virtual circuit profile, sub-profile pairs. A valid pending register of length p bits, and a memory are coupled to the link list processor. The memory stores pointers to link lists of virtual circuits associated with each of the profile, sub-profile pairs received by the link list processor. The pointers comprise, for each of the link lists, a head pointer to a first entry in the link list and a next pointer to a virtual circuit in the link list last associated by the link list processor with one of the profile, sub-profile pairs.

The invention further provides a method of scheduling available bit rate cell transmission over an asynchronous transfer mode communication network characterized by a plurality of virtual circuit communication channels, each virtual circuit being characterized by an allowed cell rate ("ACR"). MCR-rate virtual circuits requiring minimum cell rate transmission service through the network; and, ABR-rate virtual circuits requiring available bit rate transmission service through the network are generated. The MCR-rate virtual circuits are output at a constant bit rate; and, the ABR-rate virtual circuits are output at an effective allowed cell rate $ACR'_i = ACR_i - MCR_i$ where $0 \leq i \leq (n-1)$ and n is the total number of virtual circuits.

A bandwidth allocation criteria:

$$CCR_i = MCR_i + \left( \frac{BW - \sum_{i=0}^{n-1} MCR_i}{\sum_{i=0}^{n-1} ACR'_i} \right) * ACR'_i$$

is applied to the virtual circuits whenever:

$$BW \geq \sum_{i=0}^{n-1} ACR_i.$$

The bandwidth allocation criteria is reduced to:

$$CCR_i = ACR_i^{eff} = \left( \frac{BW}{\sum_{i=0}^{n-0} ACR_i} \right) * ACR_i$$

whenever:

$$\sum_{i=0}^{n-1} MCR_i = 0.$$

BRIEF DESCRIPTION OF DRAWINGS

FIGS. 3A and 3B collectively comprise a pseudo-code listing representative of an algorithm for implementing the profile queue dispatcher component of the FIG. 1 ABR scheduler.

FIGS. 6A and 6B collectively comprise a pseudo-code listing representative of an algorithm for implementing the FIG. 5 MCR/ABR' arbitrator.

FIG. 8 is a pseudo-code listing representative of an algorithm for implementing the FIG. 7 priority servicer.

FIG. 9 is a table illustrating exemplary output of the FIG. 7 priority servicer under various ABR/UBR loads.

FIG. 11 is a table illustrating measured throughput and bandwidth utilization for the FIG. 10 case study.

FIG. 14 is a table illustrating measured throughput and bandwidth utilization for the FIG. 13 case study.

FIG. 16 is a table illustrating measured throughput and bandwidth utilization for the FIG. 15 case study.

FIG. 18 is a table illustrating bandwidth allocation for the ABR' scheduler portion of the FIG. 17 case study.

FIG. 19 is a table illustrating bandwidth allocation for the MCR scheduler portion of the FIG. 17 case study.

FIG. 20 is a table illustrating the combined operation of the ABR' and MCR scheduler portions of the FIG. 17 case study.

DESCRIPTION

1. Introduction a. Pending Pointer Mechanism

Figure 1:
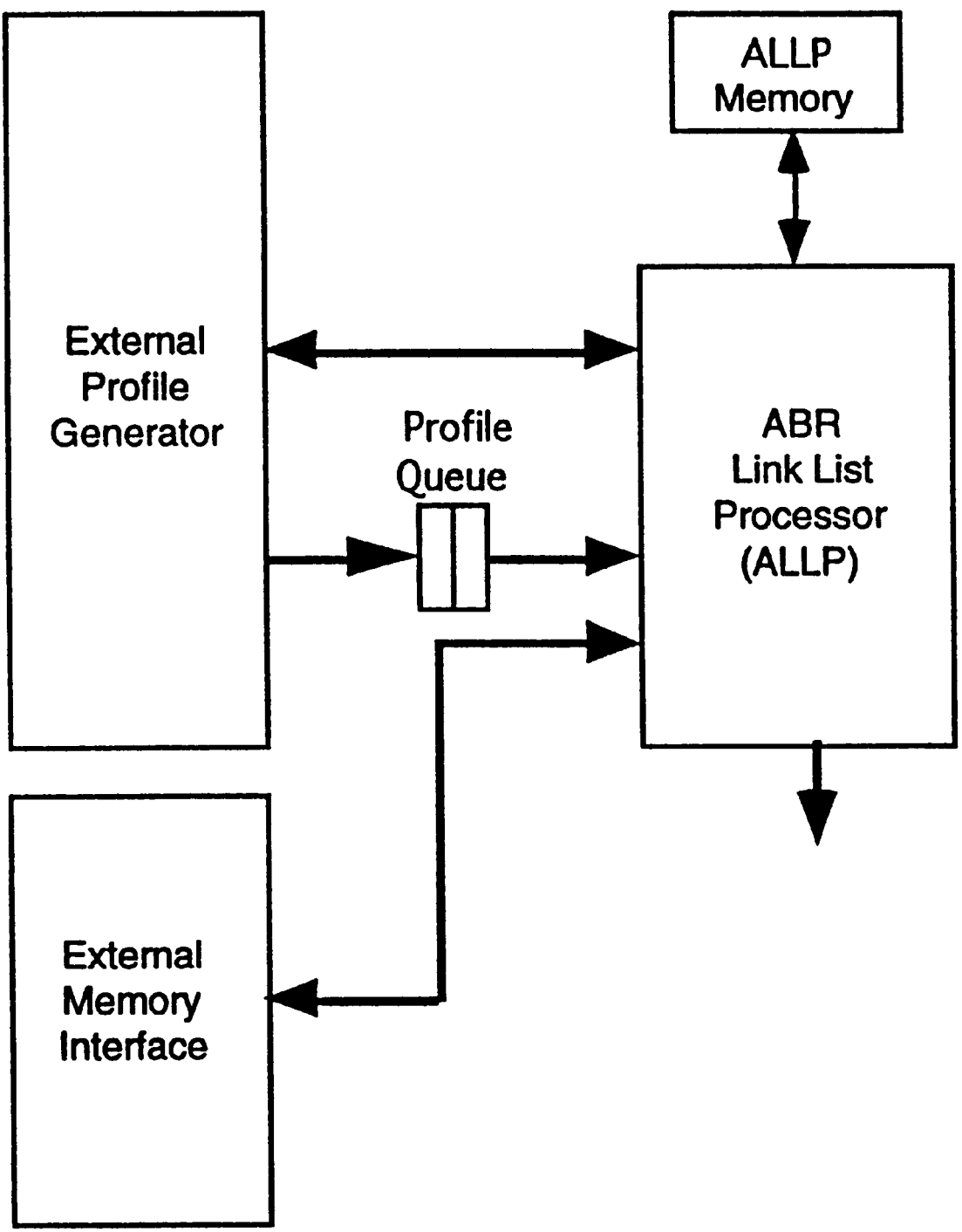
FIG. 1 is a block diagram of an ABR scheduler having an ABR link list processor (ALLP) in accordance with the invention.

The present invention overcomes the cell clumping (or burst length) problem by incorporating a "pending pointer" mechanism for each traffic profile. Each traffic profile is serviced such that only one VC is scheduled from each link list in one cell time. A pending pointer which points to the next VC in the link list is maintained for each link list. The pending pointers are processed such that all VCs are serviced correctly in under provisioned cases, and serviced fairly in over provisioned cases. The invention assists in tracking the link list more effectively and interleaves generated VC tokens. Interleaving helps guarantee that cells of different VCs (perhaps of different rates) are scheduled in sequence and consequently avoids and/or reduces cell clumping buffer overflows. The invention's modified interleaving scheme limits the burst size to the number of supported sub-profiles, independently of the link list chain.

b. Independent MCR and ACR' Schedulers

In accordance with the invention, the ABR scheduler is provided with an MCR scheduler and a separate ABR' scheduler. The MCR scheduler is similar to a constant bit rate (CBR) scheduler with guaranteed bandwidth. The ABR' scheduler is identical to the ABR scheduler described in the '398 application (for zero MCR support) with an added pending pointer mechanism, except that the effective ACR it associates with each VC is given by $ACR'_i = ACR_i - MCR_i$ where $0 \leq 1 \leq (n-1)$ and n is the total number of VCs.

In the ABR' scheduler, each VC is mapped to a given traffic profile, as dictated by ACR'. The ABR' scheduler automatically performs these arithmetic operations and performs the link list manipulation on the VCs.

Tokens output by the MCR and ABR' schedulers are arbitered by giving priority to the MCR scheduler. If no tokens are output by the MCR scheduler, the ABR' scheduler is allowed to transmit. Using this arbitration scheme, in conjunction with the ABR' scheduler's rate weighted bandwidth allocation, the fairness criterion can be shown to achieve the following:

$$CCR_i = MCR_i + \left( \frac{BW - \sum_{i=0}^{n-1} MCR_i}{\sum_{i=0}^{n-1} ACR'_i} \right) * ACR'_i \quad (8)$$

where BW is the available bandwidth and $ACR'_i=ACR_i-MCR_i$ is the current cell rate for each VC output by the scheduler.

c. Minimum Bandwidth Guarantee for ABR, UBR Services

The output of the MCR and ABR' schedulers can be arbitrated by a UBR/VBR/CBR scheduler. It is important for a user to have control over the relative weighted priorities of the ABR and UBR token streams. This is achieved in the present invention by a priority servicer which is fully controllable by the user.

The priority servicer allocates the available output bandwidth based on a set of user programmable weights. For example, the user might set the weights at 75% for ABR and 25% for UBR. A "sliding window" guarantees servicing of each stream within a predefined interval. If one stream has no data to send, then the time slot is made available to the other stream. Similarly, during the non-guaranteed service interval, if no data is available for transmission in one stream then the time slot is made available to the other stream. If either stream has no data when polled at its service interval, then the opportunity is "stored" and may be used later outside of the service interval when data is available for transmission. In general, the method guarantees a minimum bandwidth for a particular stream.

2. Use of Pending Pointers to Avoid VC Bursting

FIG. 1 depicts an ABR link list processor (ALLP) which implements the pending pointer mechanism. A profile queue buffer interfaces between an external profile generator (similar to that described in the '398 application) and the ALLP to facilitate pipelining operations. To improve efficiency, a double buffering mechanism is preferably used such that two (profile number, sub-profile vector) pairs are written to the profile queue by the external profile generator during each cell period. A cell period corresponds to a real cell time (RCT) of approximately 2.83 µs (for the STS-3c standard). The external profile generator indicates that a slot is empty by clearing (zeroing) the two entries for that slot in the profile queue. A profile_queue_full bit is set to indicate that data is available for the ALLP to read. The ALLP clears this bit after processing to free the resource. If the profile_queue_full bit is not set the ALLP remains idle or performs other internal operations.

3. ABR Link List Processor (ALLP)

The ALLP reads the profile queue entries (i.e. profile number, sub-profile vector pair) and searches its local ALLP memory to obtain a VC number. The VC number is used to access an external memory to retrieve ABR control and data parameters. For each VC accessed via the external memory, the ALLP performs certain end station functions and detection of cell type. This information, along with the VC number, is passed to a downstream queue for transmission. The ALLP avoids cell clumping by keeping track of empty slots presented by the external profile generator and fills such empty slots with any pending VCs that are available for scheduling, thus dispersing cells belonging to the same VC. The ALLP also handles out-of-rate transmission of resource management (RM) cells whose ACR has dropped below a predetermined rate.

When instructed by an external provisioning unit (not shown), the ALLP constructs a suitable link list by attaching (or detaching) a VC to a selected traffic profile in the ALLP local memory. The ALLP is also responsible for performing move operations (to relocate a VC's position) as a result of rate adjustments performed externally.

4. Cell Burst Avoidance

The main function of the ALLP is to dispatch VC token numbers corresponding to the scheduled sub-profile number on a non-bursty basis (as far as possible) from the link list by exploiting empty slot opportunities presented by the profile generator. The ALLP retrieves VC information from the ALLP memory for the selected sub-profile for this purpose. It redistributes the VCs into any available empty slot (indicated by the external profile generator through a null entry) in such a fashion that the maximum burst length is limited to the maximum number of sub-profiles (e.g. 16). This interspersed scheduling operation by the ALLP is of paramount importance in reducing buffer overflow in ATM switches and simultaneously maintains the required performance/efficiency criteria.

5. Pending Pointer and ALLP Local Memory

A "valid pending register", p bits in length (corresponding to the number of profiles) facilitates implementation of the aforementioned "pending pointer" mechanism. The pending register is used as an index to locate a profile having one of the valid pending bits (VPB) of its subprofiles asserted.

Figure 2:
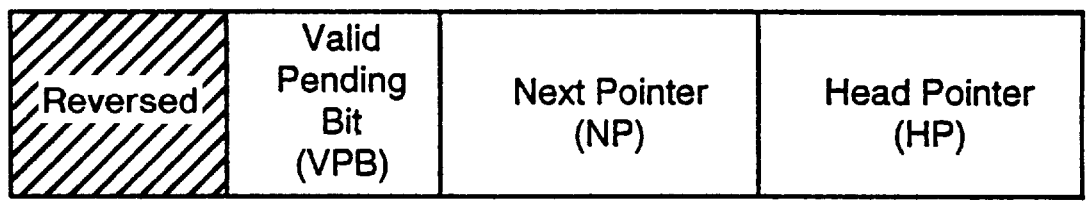
FIG. 2 is a block diagram depiction of a local memory and data structure for the FIG. 1 ABR scheduler.

FIG. 2 shows the ALLP memory data structure. The ALLP maintains a head pointer (HP) and a next pointer (NP) to each queue that is attached to a given sub-profile stored in the local ALLP memory. The HP points to the start of the link list, while the NP is used to remember the last VC serviced for that link list. The ALLP reads a profile number (p_num) and its corresponding sub-profile vector and performs a merged scheduling operation by scanning and dispatching a VC from each of the asserted sub-profiles for a given profile number. In other words, the ALLP performs a vertical scan choosing exactly one VC for each sub-profile at a time. Any remaining VCs of each sub-profile are marked as pending using the valid pending bit (VPB) and their addresses are stored as the NP in the ALLP memory. Whenever an empty slot is detected, the ALLP utilizes this opportunity to retrieve the pending VCs, if any, starting from the highest traffic rates (within the selected profile) from the ALLP memory and dispatches them accordingly.

During each real cell time, the external profile generator outputs a profile_number and a sub-profile_vector (or a null vector). Up to sp sub-profiles for each profile_number may be processed and dispatched by the ALLP. The number of such VCs dispatched by the ALLP (or look-ahead) during each real cell time is tracked using a counter n-bits in length (cell_count). The variable cell_count thus enables skipping of empty slots. If the value of the counter at any time is x, then the ALLP has sent x cells ahead of the current time. Therefore, whenever an empty slot from the external profile generator arrives, the counter is decremented by one and the slot is removed. Such empty slots are non-contiguous and dependent on the number of VCs and their allocation based on their ACRs. The cell-count counter is therefore of importance in under provisioned and equal provisioned cases where non-bursty handling of VCs is required to achieve the required efficiency/performance criteria. The size of cell_count is implementation dependent and is influenced by the number of profiles/sub-profiles.

FIGS. 3A and 3B provide a pseudo code version of the ALLP algorithm which retrieves the profile queue entries and performs non-bursty VC scheduling incorporating the pending pointer mechanism in accordance with the invention.

6. Congestion Management

The transmission source is responsible for managing local congestion, in an implementation specific manner. From the scheduler's point of view, congestion occurs when the sum of the bandwidths of the allocated connections exceeds the maximum bandwidth supported by the network i.e, in the over provisioned case. In such a situation, a given fairness criteria has to be applied such that the available bandwidth is shared effectively and efficiently by all users. The present invention implements a rate weighted bandwidth allocation scheme in which the available bandwidth is shared depending on the ACRs of the profiles and the excess bandwidth. As an example, if the available bandwidth is 16 and the total bandwidth required is 32, then all the allocated profiles have their ACRs (which are weighted on their rates) reduced by 50%.

If BW is the maximum available physical bandwidth and $ACR_i$ is the requested bandwidth for each VC i for $0 \leq i \leq n-1$, where n is the total number of provisioned VCs, and if:

$$BW \geq \sum_{i=0}^{n-1} ACR_i \quad (9)$$

then the effective bandwidth allocated by the scheduling algorithm to each VC is given by:

$$ACR_i^{eff} = \left( \frac{BW}{\sum_{i=0}^{n-0} ACR_i} \right) * ACR_i \quad (10)$$

Observe that for the equal-provisioned case where $$BW = \sum_{i=0}^{n-1} ACR_i \quad (11)$$

100% efficiency is achieved. Stated alternatively, the scheduled VC has an ACR equal to its requested rate.

7. Non-Zero MCR Guarantee Using Independent MCR and ABR' Schedulers

Figure 4:
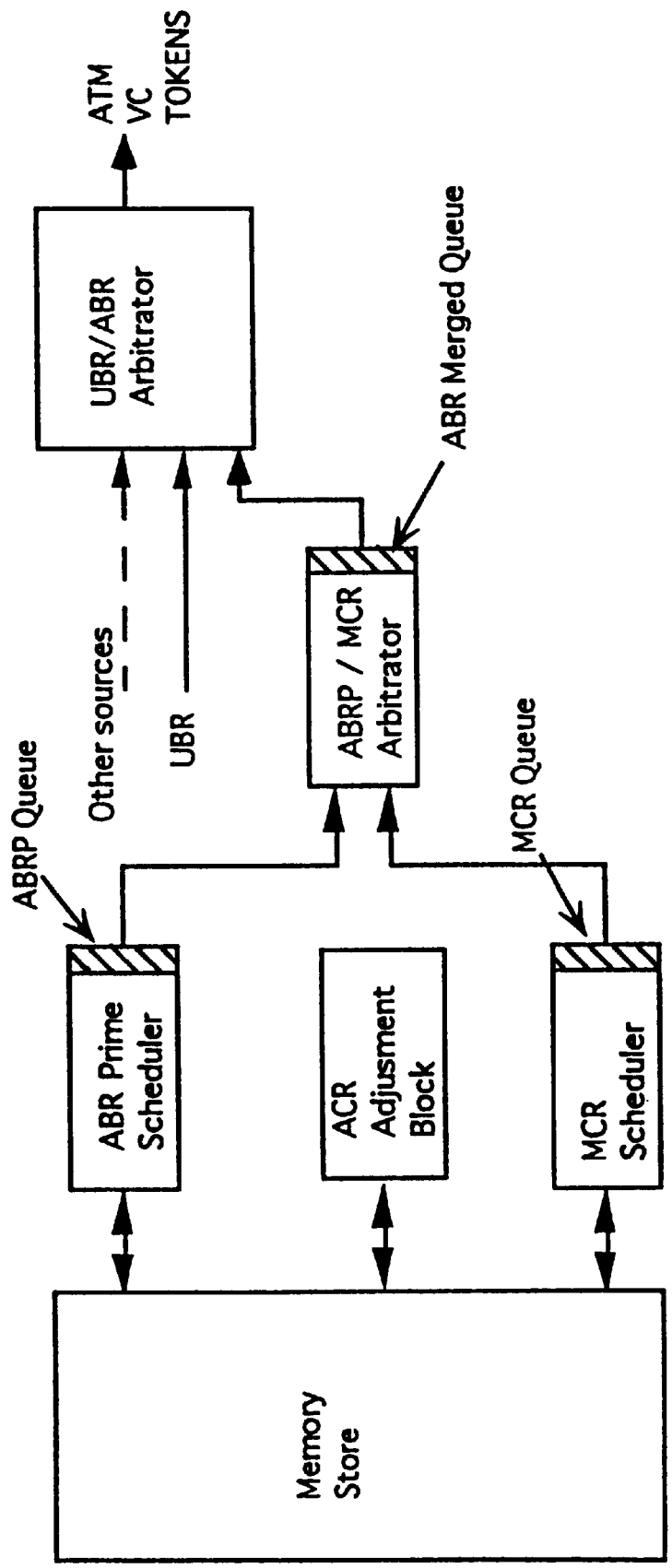
FIG. 4 is a block diagram of an integrated ABR scheduler in accordance with the invention.

FIG. 4 schematically depicts an integrated ABR scheduler which provides non-zero MCR support. As can be seen, separate ABR' and MCR schedulers are provided.

The ABR' queue and the MCR queue contain VC token information output by the respective ABR' and MCR schedulers. This token information is passed as input to the MCR/ABR' arbitrator, which executes the FIG. 6A–6B selection algorithm to choose VC tokens from either stream. The MCR/ABR' arbitrator outputs the token information as an ABR merged queue. The ABR merged queue is in turn acted upon by the UBR/ABR arbitrator which chooses cells from either the ABR merged queue or from an input stream supplied by another traffic schedulers such as UBR, CBR etc.

8. MCR Scheduler

The MCR scheduler depicted in FIG. 4 is similar to a CBR scheduler having guaranteed bandwidth. Each VC is assigned to a rate as dictated by its MCR and is given its fair share of bandwidth. For example, an ABR scheduler having only an external profile generator and an ALLP could be modified to form a simple MCR scheduler by using only a fixed (coarser) number of profiles to make each profile's MCR twice as fast as the profile below; and, by simplifying the provisioning/unprovisioning interface and the ACR adjustment, such that VCs need not be relocated by the MCR scheduler when their ACRs change.

More particularly, an MCR scheduler can be constructed by refining the ABR scheduler described in the '398 application. One refinement is to select the granularity of the traffic profiles such that there are no finer divisions on the mantissa (subprofiles) and such that the profiles are associated with rates that are a power of 2. Hence, the possible MCR rates supported by the scheduler are discrete and coarse. The MCR scheduler consists of a profile generator which outputs a sequence of profile addresses by searching the availability of VCs in local memory using a virtual time algorithm as described in the '398 application. The profile addresses are retrieved from the profile buffer and subsequently processed by the ALLP. Additional refinements include simplification of the provision/unprovisioning circuitry, since there is no explicit rate adjustment in the VCs and consequently the VCs do not shift dynamically from one link-list to another as in the general ABR case. VCs corresponding to MCR scheduling are assigned (unassigned) to the link-lists only during connection-setup (connection-collapse). Each VC is thus guaranteed an MCR bandwidth equal to the rate of the profile to which it is attached. Note that MCR schedulers cannot be over-provisioned, implying that requested bandwidth (MCR) cannot be guaranteed if the sum of the bandwidths of all provisioned VCs exceeds the maximum line rate.

The MCR scheduler is independent of the number of VCs attached to it, but the effective MCR rates are discretized and dependent upon the selected granularity. Other possible implementations could include a modified VBR scheduler based on counters. In such case the effective MCR rates could be user programmable, but at the cost of servicing only a fixed number of VCs, due to factors such as the search time required, the hardware's execution speed, and length of the link lists.

9. ABR' Scheduler

The ABR' scheduler component of the FIG. 4 integrated ABR scheduler can be identical to the ABR scheduler described in the '398 application, except that the effective ACR associated with each VC is now given by $ACR'_i = ACR_i - MCR_i$ where $0 \leq 1 \leq (n-1)$ and n is the total number of VCs. The ABR' scheduler maps each VC to a given traffic profile, as dictated by $ACR'_i$. The foregoing arithmetic operations are performed by the ACR adjustment block, which stores its results in the memory store during provisioning/unprovisioning or link list manipulation of VCs whose relative positions are altered due to feedback from resource management cells.

Operation of the ABR' and MCR schedulers is seamless, in that the bifurcation of ACR into MCR and ACR' components for each VC, its mapping into the appropriate tables, and book-keeping are totally transparent to the outside world. Consequently, the required MCR bandwidth guarantee is sustained, and the required elasticity in ACR' is maintained for every VC. Note that for a zero MCR VC, there is no corresponding entry in the MCR scheduler and consequently tokens for that VC are output only by the ABR' scheduler. The invention thus provides an integrated ABR scheduler supportive of all traffic types, with particular emphasis on efficiency and fairness in bandwidth distribution including non-zero MCR support whilst avoiding cell clumping/buffer overflow problems.

10. MCR/ABR' Arbitrator

Figure 5:
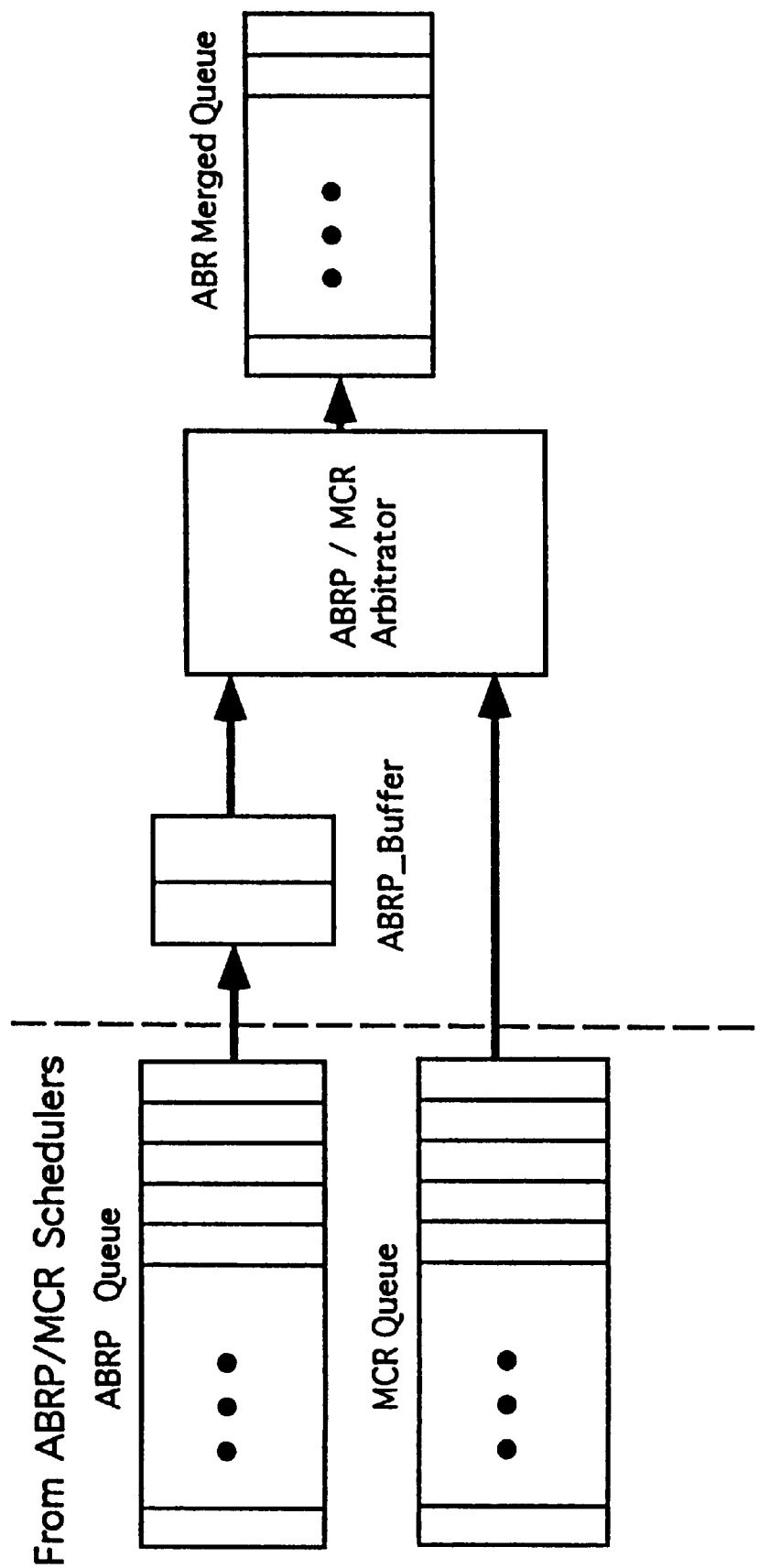
FIG. 5 is a block diagram representation of an MCR/ABR' arbitrator for the integrated ABR scheduler of FIG. 4.

FIG. 5 schematically depicts the MCR/ABR' arbitrator. Inputs to the MCR/ABR' arbitrator include the MCR queue (containing MCR token information output by the FIG. 4 MCR scheduler) and the ABR queue (containing ABR' token information output by the FIG. 4 ABR' scheduler). An ENABLE signal (not shown) initiates the MCR/ABR' arbitrator's execution of the FIG. 6A–6B algorithm. Processed token information is output by the MCR/ABR' arbitrator to the ABR merged queue.

As the MCR/ABR' arbitrator processes the token information in the MCR and ABR' queues, it assigns priority to the MCR queue. If the MCR queue contains no token information, then the ABR' queue is allowed to transmit.

FIG. 6A–6B illustrates the algorithm executed by the MCR/ABR' arbitrator. The arbitration scheme uses an internal ABR_buffer (queue) for storing ABR' tokens read from the ABR' queue. The ABR_buffer provides the necessary smoothing action in handling ABR' traffic for over provisioned cases. Simulation studies (discussed below) have shown that an ABR' buffer size of 2 is optimal for handling the arbitration without expending considerable hardware overhead. The size of the ABR merged queue is implementation dependent.

The MCR/ABR' arbitrator employs a prioritized selection scheme, in that MCR traffic is selected in precedence to ABR' traffic. In other words, if a token is available for transmission in the MCR queue then, regardless of the state of the ABR' queue, the MCR queue token is transmitted. Therefore, each VC in the MCR queue is allocated its full bandwidth, as the case may be. Only when there is an empty slot (invalid data) in the MCR queue is the ABR_buffer scanned and any available ABR' queue token(s) transmitted. Hence, the bandwidth available for ABR' tokens is given by:

$$BW^{ABR} = BW - \sum_{i=0}^{n-1} MCR_i \quad (12)$$

where BW is the total available bandwidth at the output of the arbitrator. $ACR_i$ is the ACR assigned for each VC i, where $0 \leq 1 \leq (n-1)$ after subtracting the MCR component. If:

$$BW^{ABR} \geq \sum_{i=0}^{n-1} ACR'_i \quad (13)$$

then the effective bandwidth allocated to each ABR' VC follows directly from equation (10) by substituting $ACR_i = ACR'_i$. Hence:

$$ACR'^{eff}_i = \left( \frac{BW}{\sum_{i=0}^{n-1} ACR'_i} \right) * ACR'_i \quad (14)$$

$$CCR_i = MCR_i + \left( \frac{BW^{ABR}}{BW} \right) * ACR'^{eff}_i \quad (15)$$

where $CCR_i$ is the current cell rate of the ATM cells transmitted by the scheduler. Substituting equation (14) into equation (15) yields:

$$CCR_i = MCR_i + \left( \frac{BW^{ABR}}{BW} \right) * \left( \frac{BW}{\sum_{i=0}^{n-1} ACR'_i} \right) * ACR'_i \quad (16)$$

and hence:

$$CCR_i = MCR_i + \left( \frac{BW - \sum_{i=0}^{n-1} MCR_i}{\sum_{i=0}^{n-1} ACR'_i} \right) * ACR'_i \quad (17)$$

11. Degenerate Case
If:

$$\sum_{i=0}^{n-1} MCR_i = 0 \quad (18)$$

(i.e, for the zero MCR case), then equation (17) reduces to the rate weighted bandwidth allocation criterion given by equation (10) for the case of the zero MCR scheduler.

12. Weighted Priority Control over ABR and UBR Token Streams

The foregoing discussion contemplates the generation of streams of so called "tokens". These tokens are generated by a scheduler and represent an opportunity for a downstream unit to transmit a cell from a given VC. The token streams could be generated by any type of traffic scheduler, for example a CBR, VBR, ABR or UBR scheduler. Each such scheduler represents a different type of traffic class having characteristics which are not relevant here and which therefore need not be discussed further. The essential point to note is that the generation of multiple token streams by multiple token sources (schedulers) necessitates an arbitration policy to govern the multiplexing of such streams.

Figure 7:
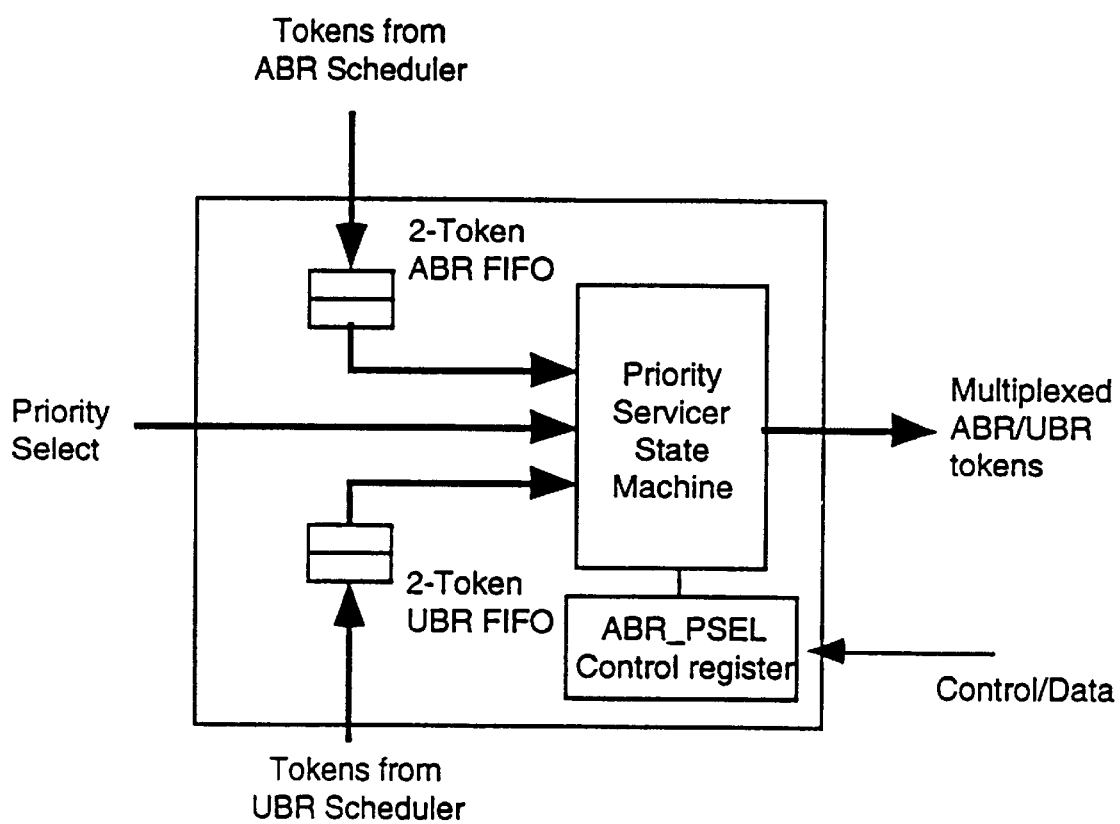
FIG. 7 is a block diagram of a simplified ABR/UBR priority servicer.

The relative priority of some of the traffic sources described above is usually implied by the traffic class. However, this is not necessarily so for ABR or UBR traffic. Indeed, ABR service is intended to offer a better quality of service (QoS) over UBR, guaranteed by the added complexity of the flow control mechanism. But, it is clear that there is a requirement for the coexistence of both services in a network, and therefore a user controllable weighted priority mechanism is required in a combined ABR/UBR scheduler, so that the relative shares of the available bandwidth can be controlled. FIG. 7 is a simplified block diagram of such a ABR/UBR priority servicer (PS).

The PS queues ABR and UBR tokens generated by the ABR and UBR schedulers respectively. The queuing is accomplished by a pair of first-in-first-out (FIFO) buffers which are each two tokens deep. Queued tokens are dispatched to a downstream FIFO (not shown) using a programmable polling priority mechanism which guarantees a fixed percentage of the excess bandwidth for either the UBR or ABR data streams. The polling rate is determined by the ABR_PSEL bits in a general control register. The polling rate determines the rate at which the ABR token FIFO is polled per cell time with respect to the polling rate of the UBR token FIFO. If polling of one of the FIFOs indicates that no token is ready to be transmitted, then the other FIFO is serviced in that cell slot if it contains a token.

By way of example, a 0% to 100% service priority range can be divided into eight steps of 12.5% each. If 0% service priority is selected, ABR tokens will never be transmitted unless the UBR token FIFO is empty. Conversely, if 100% service priority is selected, UBR tokens will never be transmitted unless the ABR token FIFO is empty.

FIG. 8 illustrates the algorithm executed by the PS. The algorithm assumes that the available output time slots are counted by an external counter, however other methods of determining when to service the queues may be used. If a counter is used, then if the counter reaches the value defined by the priority select input (selects ABR priority with respect to UBR), then the ABR FIFO is examined for availability of a token to be transmitted. If there is a token to be transmitted, then the ABR token is removed from the FIFO, and the counter is reset. If there is no ABR token, then the slot is made available to the UBR stream. In this case, the counter is held to allow an ABR token to be transmitted when one is available.

FIG. 9 shows, in tabular form, how the PS allocates the output bandwidth when presented with varying loads from the two token sources.

13. Pending Pointer Simulation

To validate the performance of the pending pointer concept in the above described ABR scheduler for supporting zero MCR traffic, a Matlab program was written and several case studies (over/under provisioned) were simulated. For the sake of tractability and computational simplicity, the number of profiles was set at p=5 and the number of sub-profiles was set at sp=4, for a total of 20 entries. The system clock frequency was set at 256 hz ($2^8$). In the present example, each cell_time corresponds to 8 cycles at a rate of 32 cells/second. Profile 1 (with sub-profile 1) has an ACR of 16, representing the maximum bandwidth (Line Rate) available. If the sum of the bandwidths of the available sub-profiles exceeds the Line Rate (16 in this case), then it results in an over-provisioned case; otherwise the case is under-provisioned. The effective rate for each profile/sub-profile was measured and the resultant bandwidth was compared with the specified rates for a simulation run consisting of 4096 profile visits.

a. Case Study 1: Equal Provisioned Case

Figure 10:
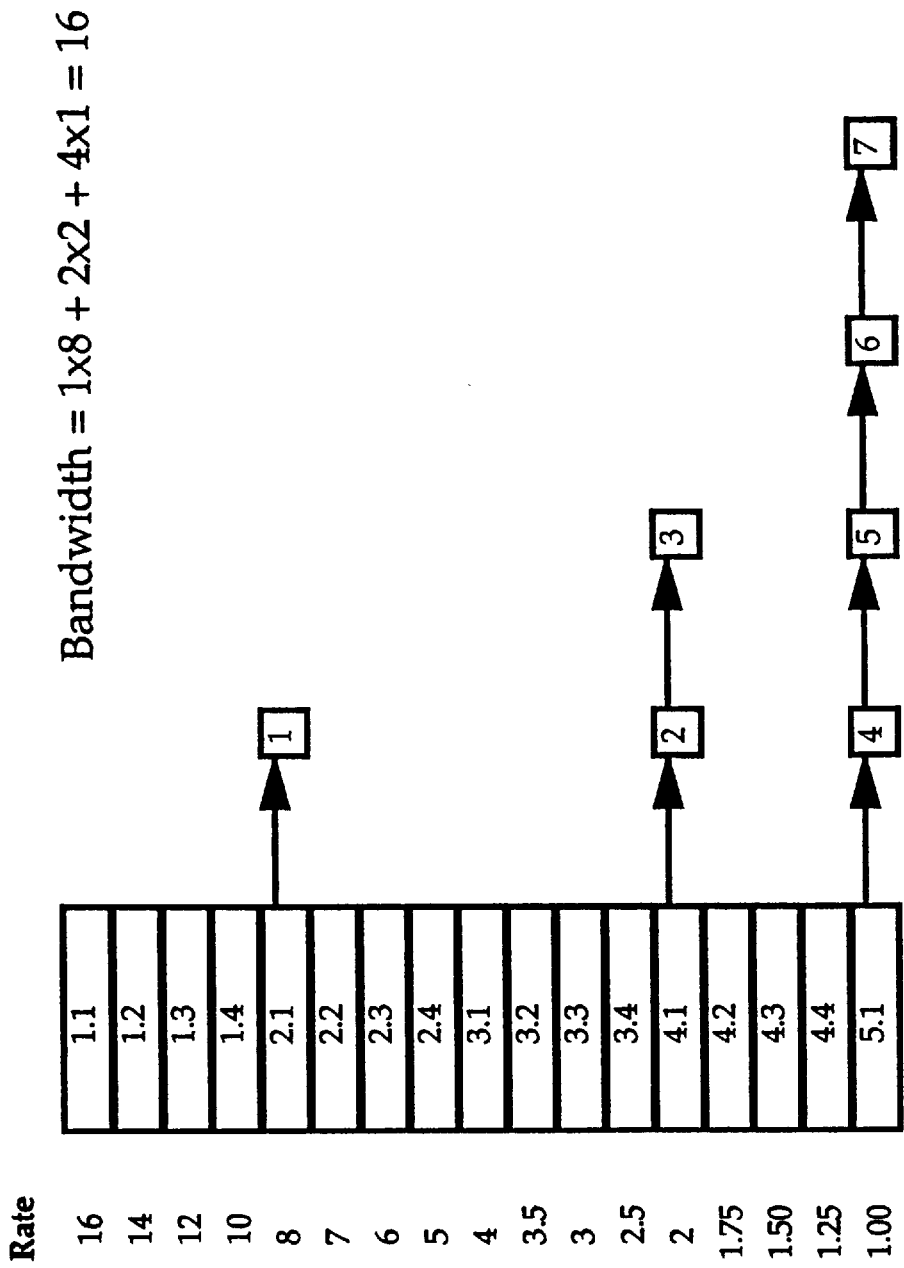
FIG. 10 depicts VC distribution in a case study of simulated equal provisioned operation of an ABR scheduler supporting zero MCR traffic in accordance with the invention.
Figure 12A:
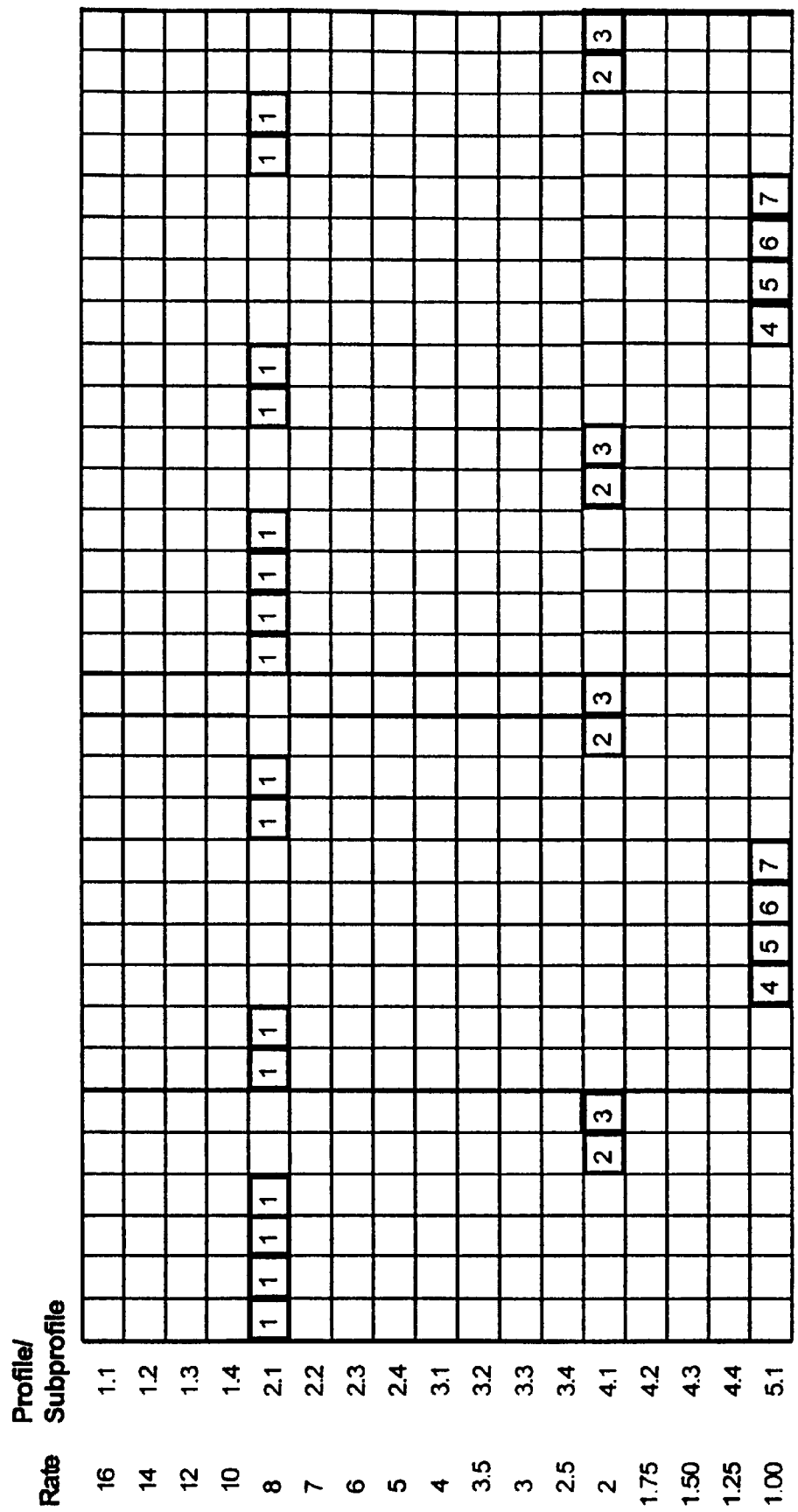
FIG. 12A shows a prior art cell distribution pattern exhibiting effects of cell clumping and buffer overflow.
Figure 12B:
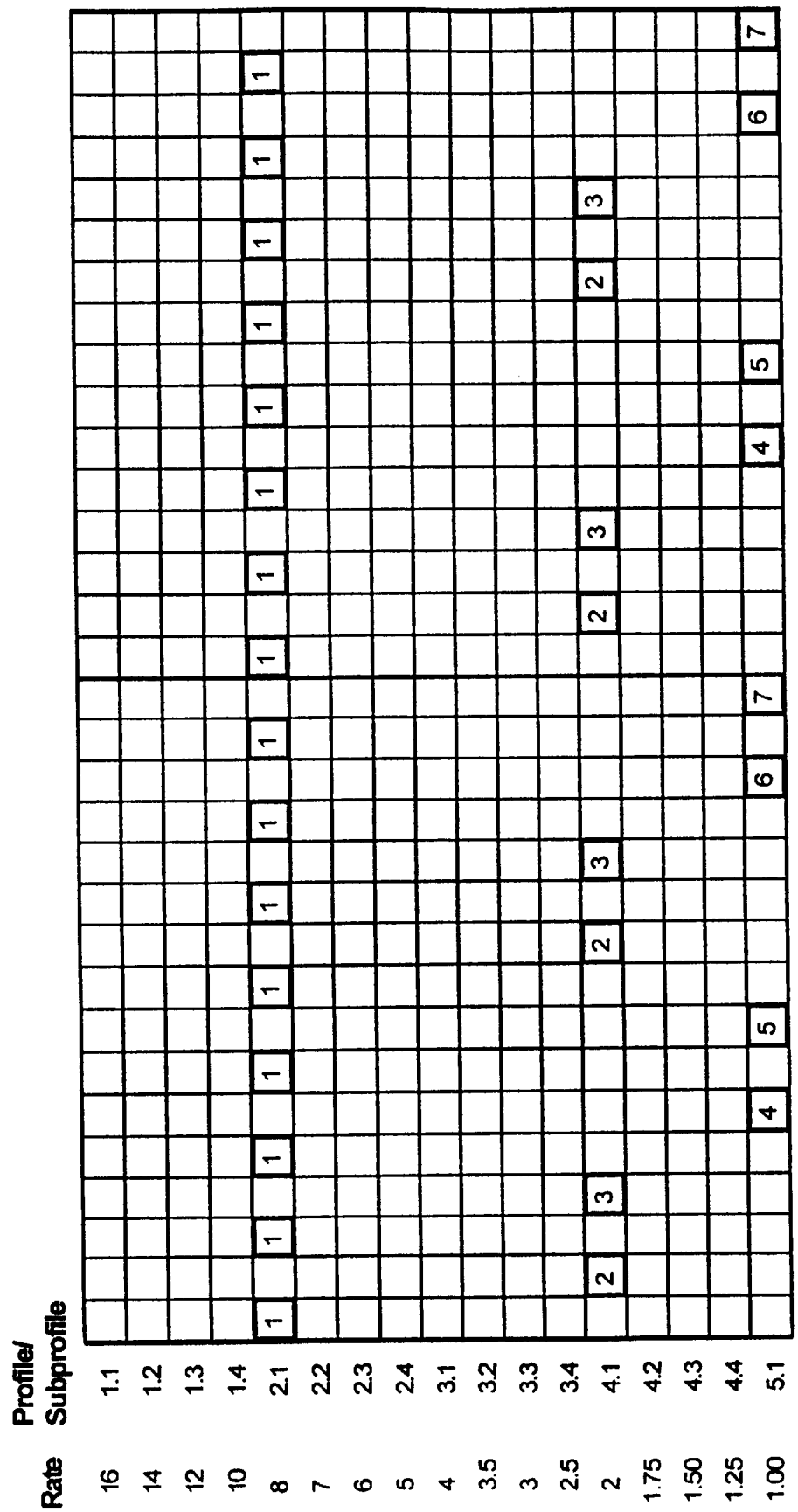
FIG. 12B shows a cell distribution pattern for the FIG. 10 case study which avoids/reduces cell clumping.

FIG. 10 depicts a typical equal provisioned case. Each VC is assigned to one of the closest profiles/sub-profiles, as dictated by their ACRs. The rates of each traffic profile are displayed in the left column. The profile/sub-profile combinations are denoted by the values in the boxes. Thus, 1.1 represents profile 1 and sub-profile 1. FIG. 11 tabulates the simulation results and FIG. 12B shows the cell distribution pattern required for various VCs to avoid/reduce cell bursting (compare FIG. 12A which depicts a prior art cell distribution pattern exhibiting effects of cell clumping and buffer overflow).

b. Case Study 2: Under Provisioned Case

Figure 13:
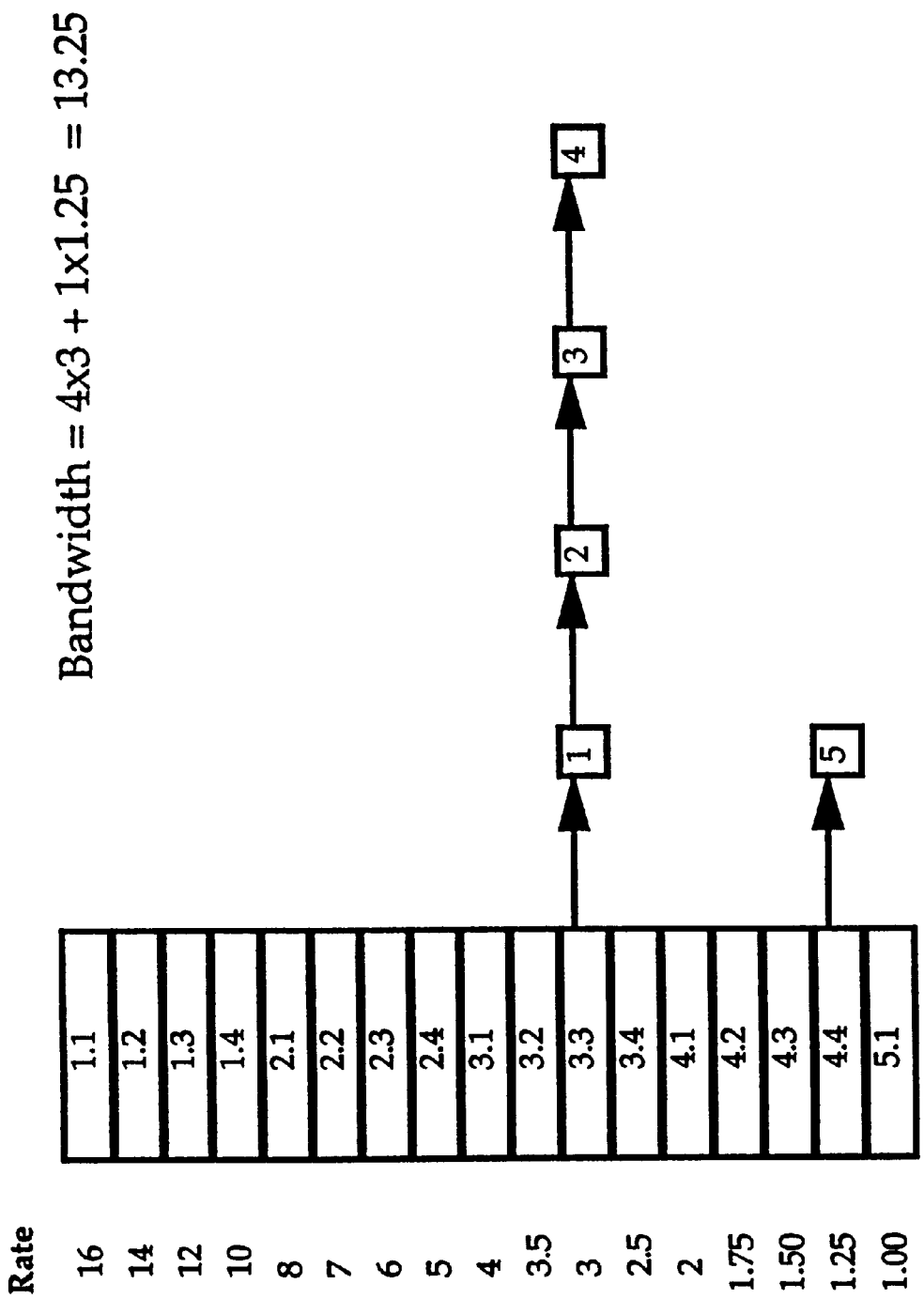
FIG. 13 depicts VC distribution in a case study of simulated under provisioned operation of an ABR scheduler supporting zero MCR traffic in accordance with the invention.

FIG. 13 depicts an example of an under provisioned case in which, for purposes of illustration, the requested bandwidth is 13.25. The simulation results (tabulated in FIG. 14) clearly show that each VC receives its fair share of bandwidth as initially requested prior to setup of the VCs, since the effective sum of the ACRs is less than the maximum bandwidth (16).

c. Case Study 2: Over Provisioned Case

Figure 15:
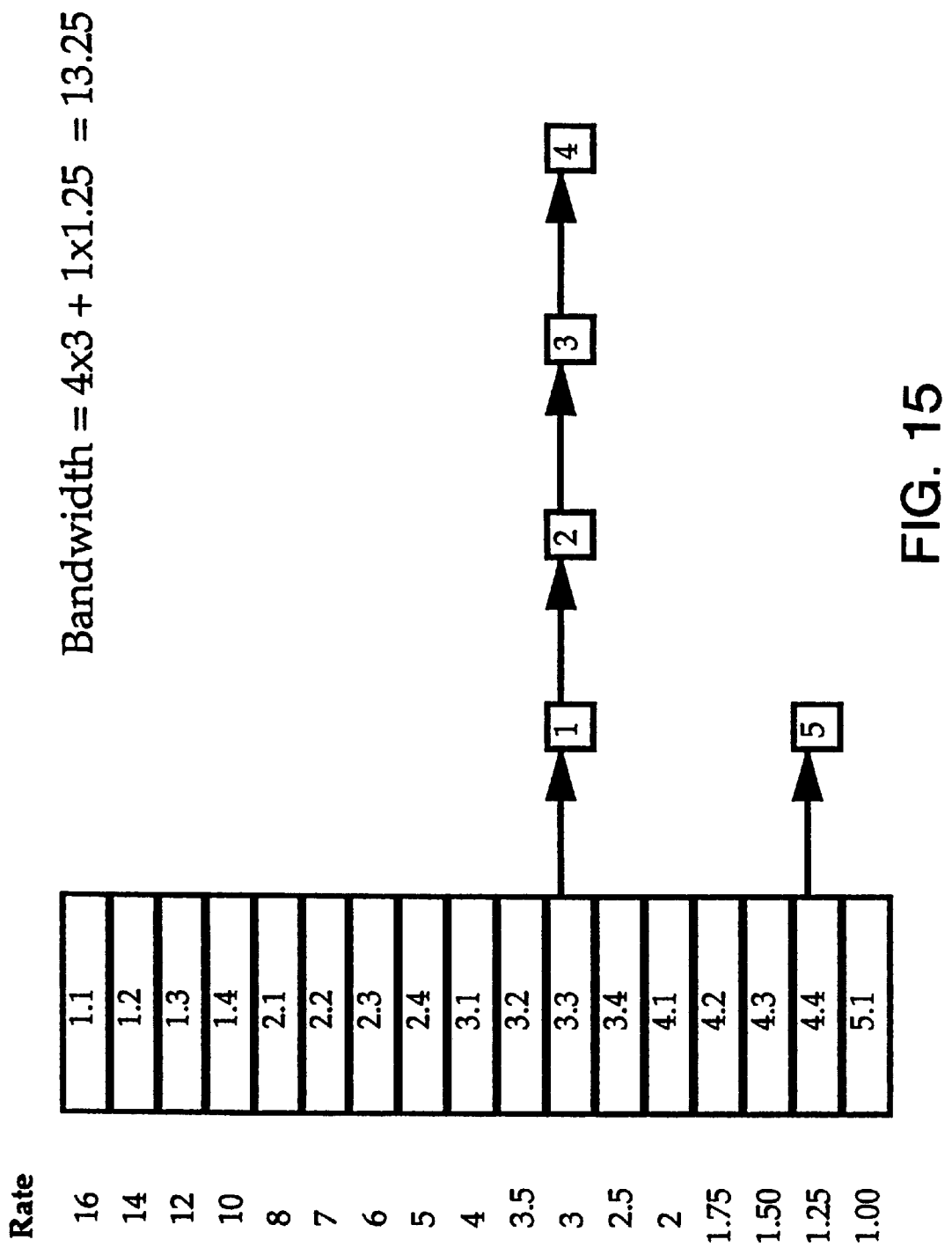
FIG. 15 depicts VC distribution in a case study of simulated over provisioned operation of an ABR scheduler supporting zero MCR traffic in accordance with the invention.

In FIG. 15, 10 VCs are provisioned. The distribution depicted in FIG. 15 results in an over provisioned case, since the sum of the bandwidth (2×16+3×7+2×4+3×1=64) exceeds the available bandwidth. FIG. 16 tabulates the simulation results for the over provisioned case.

14. MCR/ABR' Arbitrator Simulation

Matlab simulations of the MCR/ACR arbitrator algorithm were also conducted to analyze the performance of the MCR/ACR arbitrator. The results obtained for the over-provisioned case are discussed below, since that case is critical and representative of the arbitrator's internal algorithm. The simulation assumed the aforementioned conditions and initial values, viz. clock frequency of 256 Hz, Line Rate=16, and ACR discretized into 5 profiles with 4 sub-profiles each. Furthermore, it was assumed that the ABR' queue and the MCR queue were sufficiently long for the simulation period of 4096 cycles, such that zero back pressure was applied to the sources.

Figure 17:
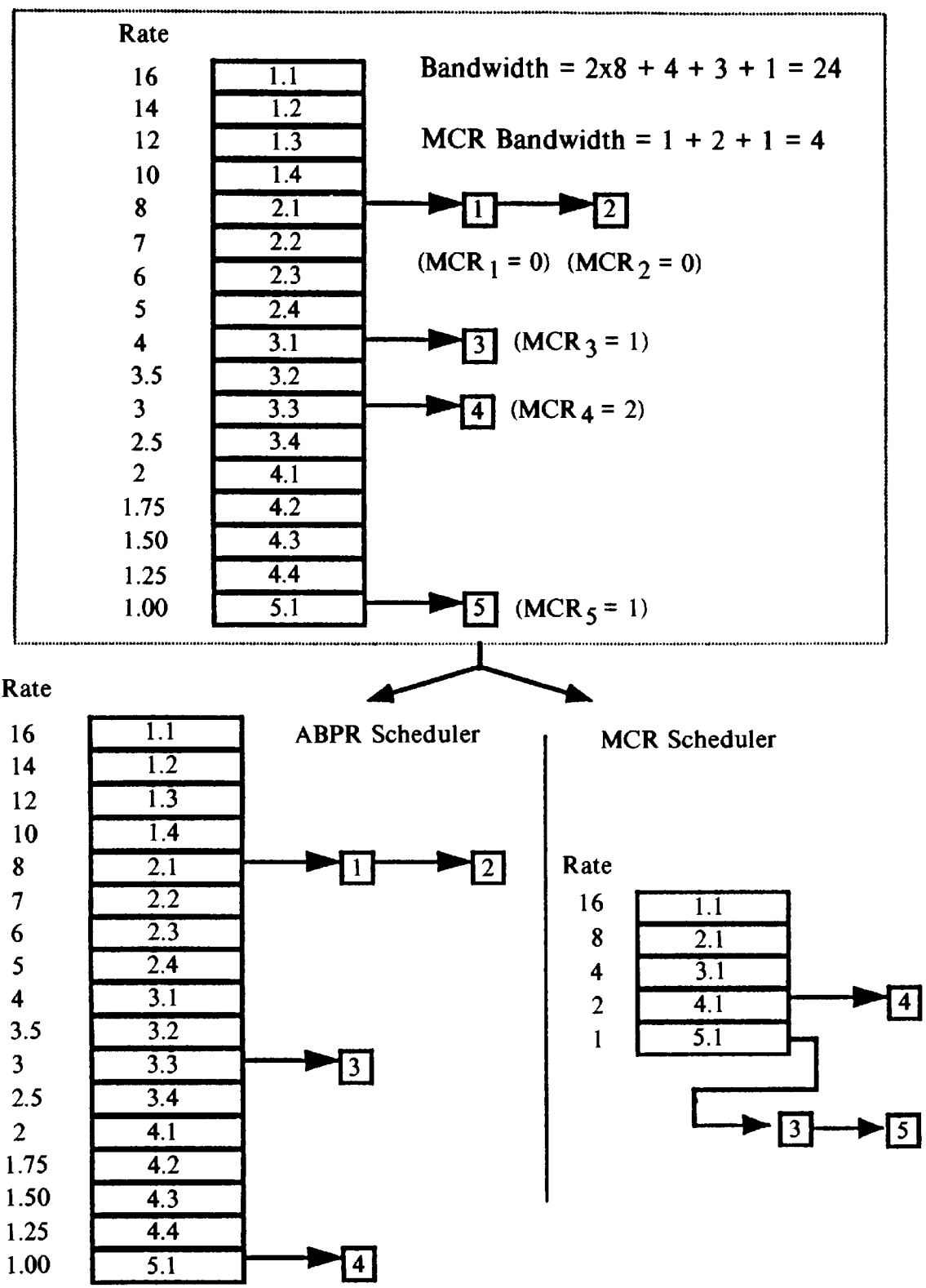
FIG. 17 depicts VC distribution in a case study of simulated over provisioned operation of the FIG. 7 MCR/ABR' arbitrator.

FIG. 17 depicts the initial allocation of VCs to the traffic profiles based on their ACRs. Note that the MCR value for each VC is indicated in brackets. Observe that the initial traffic table is partitioned such that the respective VCs are linked appropriately in the ABR' and MCR schedulers, after subtracting the MCR value from each.

15. ABR' Scheduler Output Simulation

FIG. 18 shows the results of throughput analysis of VC tokens by the ABR' queue generated by the ABR' scheduler. It can be seen that the VCs are reassigned to the traffic profiles based on the value of $ACR'_i$ for each VC where $ACR'_i=ACR_i-MCR_i$ for i=1, . . . 5. Note that VC #5 has an MCR of 1 and hence it is not assigned to any traffic profile by the ABR' scheduler and therefore receives zero bandwidth. The results are measured at the ABR' queue for each VC and the rates $ACRQ'_i$ are consistent with the rate weighted bandwidth allocation criterion, as explained above. ($ACRQ'_i$ is the effective $ACR'_i$ measured for each VC in the ABR' queue.)

16. MCR Scheduler Output Simulation

For the MCR scheduler, the required bandwidth is only 4, as denoted in FIG. 19. The MCR scheduler outputs the VCs in the MCR queue with an efficiency of 100%. VCs 3, 4, 5 get their requested share (constant bandwidth) as denoted by $MCRQ_i$ (i.e. the effective $MCR'_i$ measured for each VC in the MCR queue). Observe that VCs #1 and #2 have a zero MCR value and hence there is no contribution from the MCR scheduler for these two VCs.

17. MCR/ABR' Arbitrator Output Simulation

FIG. 20 shows the simulation results of the output of the MCR/ABR' arbitrator. Note that due to statistical variation and the finite number of simulation cycles used in the study, the final measured rate has exceeded the maximum limit (i.e over 100%) for VCs 3 and 4.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An available bit rate scheduler for asynchronous transfer mode communication of a plurality of cells over a communication network, each of said cells characterized by a virtual circuit communication channel, said scheduler comprising:

a. an MCR scheduler for receiving MCR-rate virtual circuits requiring minimum cell rate transmission service through said network and for outputting said MCR-rate virtual circuits at a constant bit rate; and, b. an ABR' scheduler for receiving ABR-rate virtual circuits requiring available bit rate transmission service through said network and for outputting said ABR-rate virtual circuits at an effective allowed cell rate $ACR'_i=ACR_i-MCR_i$ where $0 \leq i \leq (n-1)$ and n is the total number of said virtual circuits.

2. An available bit rate scheduler as defined in claim 1, further comprising a first arbitrator coupled to said MCR scheduler and to said ABR' scheduler to receive said MCR-rate virtual circuits and said AER-rate virtual circuits, said first arbitrator outputting said MCR-rate virtual circuits and said ABR-rate virtual circuits in merged priority sequence by outputting any of said MCR-rate virtual circuits received from said MCR scheduler before outputting any of said ABR-rate virtual circuits received from said ABR' scheduler.

3. An available bit rate scheduler as defined in claim 2, said first arbitrator further comprising a buffer for storing said ABR-rate virtual circuits received from said ABR' scheduler while said first arbitrator outputs said MCR-rate virtual circuits received from said MCR scheduler.

4. An available bit rate scheduler as defined in claim 3, wherein said buffer is of a size sufficient to store two of said ABR-rate virtual circuits received from said ABR' scheduler while said first arbitrator outputs said MCR-rate virtual circuits received from said MCR scheduler.

5. An available bit rate scheduler as defined in claim 2, further comprising a second arbitrator coupled to said first arbitrator to receive said MCR-rate virtual circuits and said ABR-rate virtual circuits output by said first arbitrator, and coupled to a UBR source of UBR-rate virtual circuits requiring unspecified bit rate transmission service through said network, said second arbitrator further comprising:
   a. a first buffer for receiving and storing said MCR-rate and ABR-rate virtual circuits received from said first arbitrator;
   b. a second buffer for receiving and storing said UBR-rate virtual circuits received from said UBR source;
   c. first programmable means for outputting said MCR-rate and ABR-rate virtual circuits from said first buffer at a user-programmable priority rate between 0% and 100%; and,
   d. second programmable means for outputting said UBR-rate virtual circuits from said second buffer at a priority rate of 100%—said user-programmable priority rate.

6. An available bit rate scheduler as defined in claim 5, wherein:
   a. said first buffer is a first-in-first-out buffer of a size sufficient to store two of said MCR-rate or ABR-rate virtual circuits received from said first arbitrator; and,
   b. said second buffer is a first-in-first-out buffer of a size sufficient to store two of said UBR-rate virtual circuits received from said UBR source.

7. An available bit rate scheduler for asynchronous transfer mode communication of a plurality of cells over a communication network, each of said cells characterized by a virtual circuit communication channel, each of said virtual circuits characterized by one or more profiles, said profiles each comprising a group of sub-profiles, each of said sub-profiles having a unique bandwidth allocation component, said scheduler comprising:
   a. a profile queue buffer for receiving, pairing and storing said profiles and said sub-profiles;
   b. a link list processor coupled to said profile queue buffer to receive said profile, sub-profile pairs, said link list processor further comprising:
      i. means for detecting a null profile, sub-profile pair in said buffer; and,
      ii. means for over-writing said null profile, sub-profile pair with a selected one of said virtual circuit profile, sub-profile pairs.

8. An available bit rate scheduler as defined in claim 7, further comprising a valid pending register of length p bits, and memory means coupled to said link list processor, said memory means for storing pointers to link lists of virtual circuits associated with each of said profile, sub-profile pairs received by said link list processor, said pointers further comprising, for each of said link lists, a head pointer to a first entry in said link list and a next pointer to a virtual circuit in said link list last associated by said link list processor with one of said profile, sub-profile pairs.

9. A method of scheduling available bit rate cell transmission over an asynchronous transfer mode communication network characterized by a plurality of virtual circuit communication channels, each of said virtual circuits characterized by an allowed cell rate ACR, said method comprising:
   a. generating MCR-rate virtual circuits requiring minimum cell rate transmission service through said network;
   b. generating ABR-rate virtual circuits requiring available bit rate transmission service through said network;
   c. outputting said MCR-rate virtual circuits at a constant bit rate; and, d. outputting said ABR-rate virtual circuits at an effective allowed cell rate $ACR'_i = ACR_i - MCR_i$ where $0 \leq i \leq (n-1)$ and n is the total number of said virtual circuits.

10. A method as defined in claim 9, further comprising outputting said MCR-rate virtual circuits and said ABR-rate virtual circuits in merged priority sequence by outputting any of said generated MCR-rate virtual circuits before outputting any of said generated ABR-rate virtual circuits.

11. A method as defined in claim 10, further comprising applying a bandwidth allocation criteria:

$$CCR_i = MCR_i + \left( \frac{BW - \sum_{i=0}^{n-1} MCR_i}{\sum_{i=0}^{n-1} ACR'_i} \right) * ACR'_i$$

to said virtual circuits whenever:

$$BW \geq \sum_{i=0}^{n-1} ACR_i.$$

12. A method as defined in claim 11, further comprising reducing said bandwidth allocation criteria to:

$$CCR_i = ACR_i^{eff} = \left( \frac{BW}{\sum_{i=0}^{n-1} ACR_i} \right) * ACR_i$$

whenever:

$$\sum_{i=0}^{n-1} MCR_i = 0.$$

13. A method as defined in claim 10, further comprising:
   a. receiving said MCR-rate virtual circuits and said ABR-rate virtual circuits together with UBR-rate virtual circuits requiring unspecified bit rate transmission service through said network;
   b. outputting said MCR-rate and ABR-rate virtual circuits at a user-programmable priority rate between 0% and 100%; and,
   c. outputting said UBR-rate virtual circuits at a priority rate of 100%—said user-programmable priority rate.

14. A method of scheduling available bit rate cell transmission over an asynchronous transfer mode communication network characterized by a plurality of virtual circuit communication channels, each of said virtual circuits characterized by one or more profiles, said profiles each comprising a group of sub-profiles, each of said sub-profiles having a unique bandwidth allocation component, said method comprising:

a. pairing said profiles with said sub-profiles and storing said profile, sub-profile pairs;

b. sequentially processing each one of said profile, sub-profile pairs by:
  i. comparing said one profile, sub-profile pair with a null profile, sub-profile pair to determine whether said one profile, sub-profile pair is null;
  ii. transmitting said one profile, sub-profile pair if said one profile, sub-profile pair is not null; and,
  iii. over-writing said one profile, sub-profile pair with a selected non-null virtual circuit profile, sub-profile pair if said one profile, sub-profile pair is null.

15. A method of scheduling available bit rate cell transmission over an asynchronous transfer mode communication network characterized by an MCR queue, an ABR' queue, an ABR' buffer and an ABR merged queue, said method comprising the steps of:

a. removing from said MCR queue and transmitting to said ABR merged queue any data values contained in said MCR queue;

b. if said MCR queue contains no data values and if said ABR' buffer contains no data values then transmitting a null data value to said ABR merged queue;

c. if, prior to performing said step (a), said MCR queue contained at least one data value and if said ABR' queue contains at least one data value then removing from said ABR' queue and transmitting to said ABR' buffer said data values contained in said ABR' queue;

d. if said MCR queue contains no data values and if said ABR' buffer contains at least one data value then:
  i. removing from said ABR' buffer and transmitting to said ABR merged queue said data values contained in said ABR' buffer;
  ii. if said ABR' queue contains at least one data value after performing said step (d) (i) then removing from said ABR' queue and transmitting to said ABR' buffer said data values contained in said ABR' queue; and, e. if, prior to performing said step (a), said MCR queue contained at least one data value and if said ABR' buffer is not full and if said ABR' queue contains at least one data value then removing from said ABR' queue and transmitting to said ABR' buffer said data values contained in said ABR' queue.

16. A method of scheduling available bit rate cell transmission over an asynchronous transfer mode communication network characterized by a plurality of virtual circuit communication channels, each of said virtual circuits having one or more prioritized profiles, each of said profiles having one or more prioritized sub-profiles, and further characterized by a pending pointer for indicating the highest priority one of said profiles for which any of said virtual circuits are pending, said method comprising the steps of:

a. selecting a pair of said profile, sub-profile values;

b. if both of said selected profile, sub-profile values are null, determining whether any virtual circuits are pending, as indicated by said pending pointer;

c. if no virtual circuits are pending, as indicated by said pending pointer, dispatching a null pointer and then terminating performance of said method;

d. if any virtual circuits are pending, as indicated by said pending pointer, then in highest priority sequence for each of said profiles:
  i. selecting the highest priority one of said sub-profiles associated with said selected profile, as indicated by said pending pointer;
  ii. determining whether any virtual circuits associated with said selected sub-profile are pending;
  iii. if any virtual circuits associated with said selected sub-profile are pending, dispatching said pending virtual circuits;
  iv. repeating said steps (d) (i) through (d) (iii) in highest priority sequence for every sub-profile associated with said selected profile and then terminating performance of said method;

e. if either of said profile, sub-profile values are not null, then:
  i. for each of said profiles, determining whether any virtual circuits associated with any of said profiles are pending, as indicated by said pending pointer;
  ii. if no virtual circuits associated with any of said profiles are pending, proceeding to step (e)(iii)(6);
  iii. if any virtual circuits associated with any of said profiles are pending, then:
    (1) selecting said one of said profiles indicated by said pending pointer;
    (2) selecting the highest priority one of said sub-profiles associated with said selected profile;
    (3) dispatching the highest priority pending virtual circuit associated with said selected sub-profile;
    (4) repeating said steps (e) (iii) (2) and (e)(iii)(3) in highest priority sequence for every sub-profile associated with said selected profile until all pending virtual circuits associated with said respectively selected sub-profiles are dispatched;
    (5) resetting said pending pointer to indicate that no virtual circuits associated with said selected profile are pending;
    (6) reselecting said highest priority one of said sub-profiles associated with said selected profile;
    (7) dispatching, from a virtual circuit queue, one virtual circuit in association with said reselected sub-profile;
    (8) repeating said steps (e) (iii) (6) and (e)(iii)(7) once, in highest priority sequence, for every sub-profile associated with said selected profile;
    (9) if no virtual circuits remain in said queue, resetting said pending pointer to indicate that no virtual circuits associated with said selected profile are pending; and,
    (10) terminating performance of said method.

* * * * *